Feb. 19, 1929. 1,702,446
A. F. G. LUCAS ET AL
LUBRICATOR
Original Filed Feb. 26, 1925   2 Sheets-Sheet 2
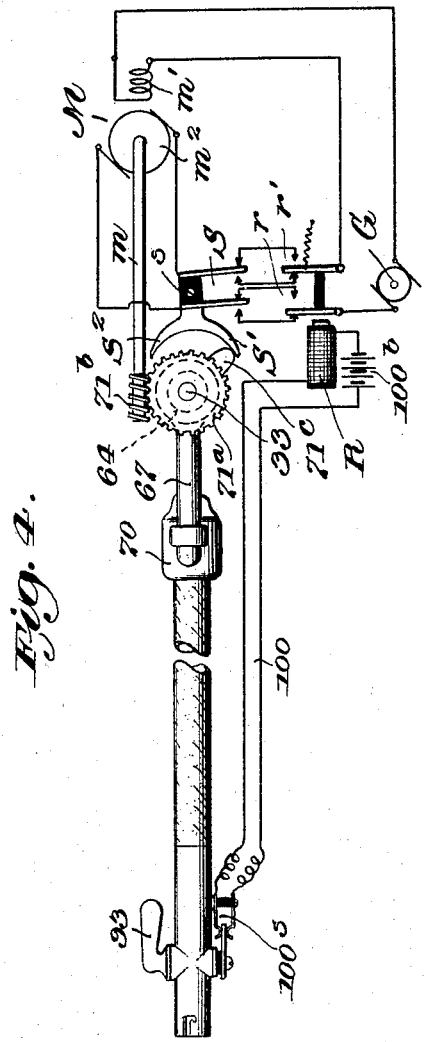
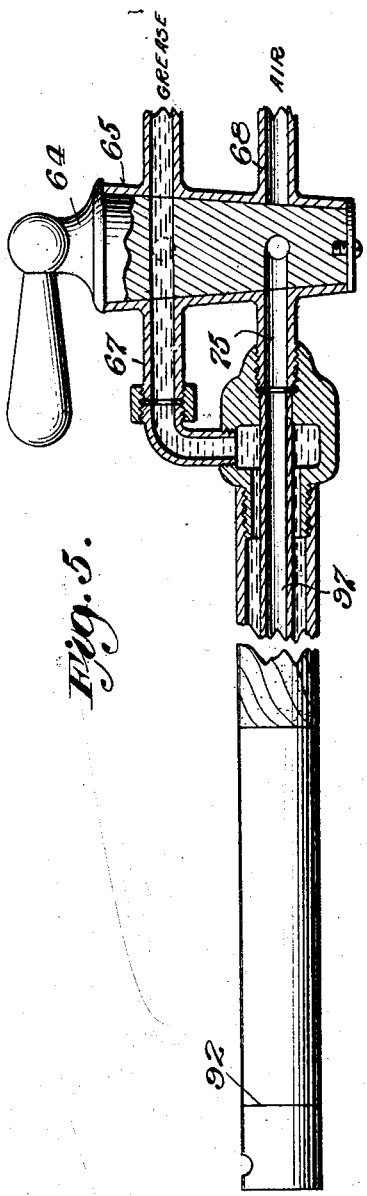

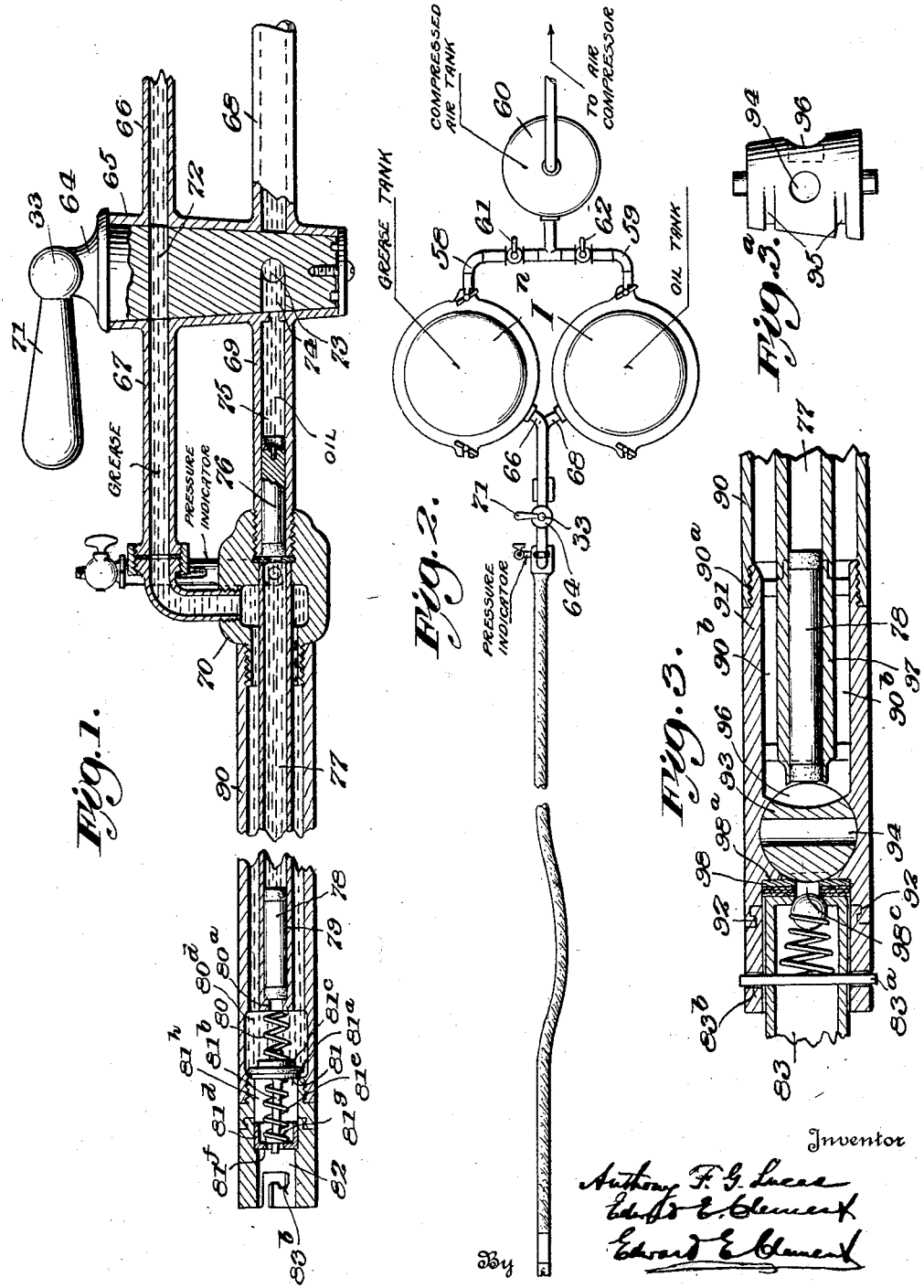

Patented Feb. 19, 1929.

1,702,446

UNITED STATES PATENT OFFICE.

ANTHONY F. G. LUCAS AND EDWARD E. CLEMENT, OF WASHINGTON, DISTRICT OF COLUMBIA; SAID CLEMENT ASSIGNOR TO SAID LUCAS.

LUBRICATOR.

Original application filed February 26, 1925, Serial No. 11,853. Divided and this application filed October 30, 1925. Serial No. 65,852.

Our invention relates to lubricating apparatus, especially for such apparatus applied to the lubrication of automotive machines. It is the object of our invention to attain complete and efficient lubrication of every bearing with a single operator, each bearing receiving a unit quantity, or a definite number of units, of the grease as prescribed by the lubrication chart of the manufacturer, the application of pressure for forcing the lubricant into the bearing, the measuring of the same, and the feed of the lubricant to the point of application, all being automatic and controlled at said point of application.

In order to attain our objects we provide a nozzle coupling adapted for connection to the bearings of an automotive vehicle, a grease tank connected to the nozzle by means of a hose or tube, a plunger or driving piston in the nozzle for forcing grease into a bearing, and means carried through the grease tube for supplying pressure to the said plunger in the nozzle, together with means mounted on the nozzle for controlling said pressure. An incidental feature is the supply of pressure for maintaining constant feed of the grease through the tube to the nozzle.

This application is a division of our prior copending application, Serial No. 11,853, filed February 26, 1925.

In the drawings herewith:

Fig. 1 is a longitudinal section of a tube, nozzle and connected parts, embodying our invention.

Fig. 2 is a plan view of same, showing the grease and oil tanks and compressed air tank.

Fig. 3 is a sectional view of a modified form of valved nozzle.

Fig. 3$^a$ is a side view of the valve plug of Fig. 3 removed.

Fig. 4 is a diagram showing electrical nozzle control and electrical valve operation.

Fig. 5 is a side view partly in section showing a modification employing compressed air as the power actuating medium.

Referring to the drawings, and especially to Figures 1 and 2, the valve 33 has a turning plug 64 ground into a casing 65 having nipples 66, 67, 68 and 69 coupled to the feed pipes from the grease and oil drums $I^n$—$I^n$ (see Fig. 2) on the one hand, and to the union 70 of the flexible hose 90 on the other hand. The turning plug 64 is supposed to be turned through an angle of 90 degrees by means of the handle 71. When it is turned in one direction as shown, the passage 72 is opened through, so as to permit the flow of grease from the tank I to the union 70 and thence through the hose. With the plug in this position, the through channel 73 is turned so as to communicate with an exhaust opening in the side of the casing 65, and the T branch 74 connects this exhaust with the passage 75 so as to permit the oil therein to escape, whereupon it is received in a suitable vessel such as a tank or bucket to be later on returned to the oil tank $I^n$. When the valve is turned through 90 degrees from the position shown, the passage 72 is closed, which stops the flow of grease and the passage 73 is opened so as to permit the free flow of oil under pressure against the piston 76, which in turn communicates pressure to the body of oil 77 in the inner tube of the hose, and through that body of oil to the piston 78, which reciprocates in the cylinder 79, so as to compress and force out the grease 80 through the valve 81 when open, and the coupling 82 into the fitting 83 attached to the bearing.

The coupling 82 on the hose nozzle, which is preferably fitted with a tight swivel so as to permit it to be turned independently in engaging with the fitting 83 on a bearing, is the standard solid metal coupling in use with so-called "Alemite" fittings, and the valve 81 with its connections, as well as the fitting 83 shown in Fig. 1 and elsewhere, are all of the standard type employed in the Alemite system. The coupling 82 is secured to the flexible hose by means of screw threads as shown, or otherwise in any desired or suitable manner. The hose is supposed to be made of the usual armored flexible tubing, and such hose units are usually finished off at the ends with a solid metal ring threaded or otherwise prepared to make a tight joint with adjacent fittings. These parts have been illustrated in Fig. 1 merely as a matter of convenience. It will be understood that the coupling shown in Fig. 2 is the same as that shown in section in Fig. 1 and is secured to the flexible hose in the same way. With regard to the plunger 78, this works in a solid metal cylinder 97 which is secured to the inner tube 77 in any suitable manner, as for example in the manner shown in Fig. 3. Figs. 1 and 2 are diagrammatic, but it should be understood that were the mechanical details put in these figures, they would appear as shown in Fig. 3 at 90ª, 77, 97, etc.

81 is a steel ring resting on a shoulder in the interior of the tube, and 81ª is a leather washer resting upon it. 81ᵇ is a steel stem expanding through the opening in the rings 81—81ª to form a head 81ᶜ, against which a compression spring 81ᵉ rests, the other end of which is supported on a fixed portion of the nozzle at 81ª. 81ᵈ is a leather cup washer centrally perforated, and normally forced by the spring 81ᵉ against the shoulder 81ᶠ. The end of the steel stem 81ᵇ protrudes through the central perforation in this cup, being shouldered and the end being slotted through the shoulder to permit the ready flow of grease from the chamber 81ʰ into the chamber 82, when the valve 81 is open and the plunger is forced forward to put pressure on the grease in the chamber 80ᵈ.

No claim is made herein to this construction of the nozzle with its valves and springs, except in combination with the plunger 78 and the other mechanism, as presently pointed out.

Figs. 3 and 3ª show a modified form of nozzle, using the principle of a tight valve closure at the end of the nozzle, so as to cut off all flow of grease inside the end of the nozzle at the point of connection with a fitting 83. By this means, leakage is absolutely avoided, and the operation of the system is greatly improved. The hose pipe 90 is provided with a nozzle 91 which may have a swivel 92 at the end, and the nozzle is provided with a transverse turning plug 93 preferably ground into its seat. This turning plug is preferably somewhat tapered, so that it can be drawn or thrust into a tight fit; and it has a channel 94 through it, two cam slots 95 cut in one side, and a channel 96 cut in the other. The tube 90 is coupled to the nozzle by means of a screw threaded joint 90ª, and the inner tube 77 is similarly coupled to a short inner tube or cylinder 97 permanently fixed within the nozzle, and containing the piston 78. The fitting 83 in this case, which is of the usual Alemite type, is received in the end of the nozzle, so that its cross pins 83ª fall into the bayonet slots 83ᵇ and its end presses against a washer 98, formed in part of a compressible material such as leather and in part of a metal washer or ring 98ª having projections 98ᵇ formed up on opposite sides of the opening 98ᶜ, so as to register with the cam slots 95 in the turning plug 93, as indicated by dotted lines in Fig. 3. The plug in this figure is shown in closed position with its channel 94 across the nozzle, and the front opening entirely closed at the solid part of the plug. In this position of the plug, the projections 98ᵇ on the washer lie in the deepest parts of the cam slots 95, consequently there is no pressure exerted on the washer, or on the end of the fitting 83, and the swivel end of the nozzle can be turned thereon to disengage the bayonet slots 83ᵇ from the pins 83ª, and permit the withdrawal of the nozzle. In attaching the hose to a bearing the reverse procedure is followed. The swivel end is applied to the fitting 83, and after the pins 83ª are seated in the ends of the bayonet slots 83ᵇ, the valve 93 is turned so as to throw the opening or channel 94 into line with the axis of the piston 78, whereupon the high part of the slotted cam 95 will come under the projections 98ᵇ on the washer 98, and will force the same to the left against the end of the fitting, compressing the leather portion 98ᶜ and at the same time forcing the pins 83ª into firm engagement with the locking depression in the ends of the bayonet slots, so that the nozzle cannot be removed from the fitting while the channel 94 is opened.

The method of supplying the grease through the hose to the fitting with this arrangement is as follows: With the valve 93 in the position shown in Fig. 3, the valve 64 in Fig. 1 should be also as shown therein, that is to say, with the grease passage 72 open and the oil vent 73 open. The result is that grease under pressure from the tank Iⁿ (see Fig. 2) is forced through the nipple 66, passage 72 and the nipple 67, coupling 70 and the hose 90, (all as shown in Fig. 1) to the nozzle in Fig. 3, through the openings 90ᵇ therein, and through the port or channel 96 in the valve to the front end of the plunger or piston 78, which being thus exposed to pressure at one end only, will be forced back, forcing before it the oil in the inner tube 77, also forcing back the plunger 76 and forcing the oil 75 through the passage 74 and the port 73 into the exhaust receiver. The piston 78 moves back until it has reached the limit of its stroke determined by any proper stop, after which the flow of grease is checked, and the nozzle is loaded ready for discharge into a bearing. When the valve 93 is turned for such discharge, the valve handle 71 should also be turned through 90 degrees, to connect the nipple 68 through the passage 73 with the nipple 69, and to cut off the passage 72 so as to prevent any flow of grease therethrough. With the parts in this position, (the channel 94 being open through from the cylinder 97 to the opening 98ᶜ in the washer 98) oil under pressure from the tank Iⁿ in Fig. 2 flows through the nipple 68 to the passage 73 to the nipple 69 to force forward the plunger 76, which in turn exerts pressure on the oil in the tube 77, and thereby forces forward the plunger 78, (Fig. 3) which in turn forces the grease in the cylinder 97 through the channel 94 to the opening 98ᶜ and past the spring pressed ball valve into the fitting. It should be understood that after the first shot, the passage 94 is always full of grease, which of course is counted as a part of the unit which is injected each time by the action of the plunger or piston 78.

The apparatus and its operation thus described are characterized by one feature to which particular attention is directed, viz: that of having the grease injected into a bearing by pressure applied at the bearing, and not at the other end of the tube. It is very difficult to pass grease through a tube of any length under pressure, as heretofore pointed out, unless time enough is permitted. In our device we permit the grease to pass in the intervals between shots, which are usually 5 or 10 times as long as the times consumed in the shots themselves. The use of oil as a propelling pressure or transmitting medium instead of heavy grease we believe to be novel and original with us and shall claim the same accordingly, as well as the other features pointed out.

In describing Figs. 1, 2, 3 and 5 a manually operated turning plug or valve 64 has been assumed for controlling the supply of grease as well as the pressure employed at the nozzle for injecting the same into the bearings. In actual operation this valve is automatic, with an electric motor, gearing and reversing switch controlling the same. In Fig. 4 we have shown the detail of this automatic control. The figure is a diagram with the parts in plan so that the valve itself 64, is indicated in dotted lines and only the upper nipple 67 is seen. On the stem 33 of the valve instead of the handle 71 is a worm gear $71^a$ with which meshes a worm $71^b$ on the shaft $m$ of a motor M having field and armature windings $m'$—$m^2$ respectively. A reversing switch S is pivoted at $s$ and provided with anchor arms $s'$—$s^2$ acted upon alternately by a cam projection $71^c$ connected with the gear wheel $71^a$ and with the stem of the valve 33. In one position the reversing switch connects the field and armature windings of the motor for direct drive, and in the other position it connects them for reverse drive, according to the position of the valve. The actual movement of the motor and of the valve is controlled by means of a relay R which has armature contacts $r$—$r'$, included in series with the contacts of the reversing switch S. Thus, to turn the valve stem 33 in one direction requires reversing switch S to be in one position and the relay R to be energized or de-energized so as to close the circuit with the switch in that position. The relay R has its windings included in a circuit 100 with the battery $100^b$ and switch contacts $100^s$ which are closed and opened in the closing and opening of the nozzle valve 93. Thus the operator by opening and closing the valve 93 may control the opening and closing of the pressure and supply valve 64. As shown, the valve stem turns through 90 degrees, but of course this may be varied according to the necessities of the case. The motor M is shown as a series motor, but this also may be changed, the showing thus adopted being merely for convenience and not as a matter of limitation.

Assuming the nozzle valve 93 to be open, and other parts in the position shown in Fig. 4, and referring to Figs. 1 and 3 for the detail, the pressure of oil against the piston 76 will force the piston 78 forward in the nozzle, and thereby inject one unit of grease into the bearing to which the nozzle is connected. The operator then turns the valve 93 so the handle lies across the nozzle, which closes the valve as shown in Fig. 3, and also breaks the circuit 100 at the contacts $100^s$. The relay R thereupon lets go its armature, and the contacts $r$—$r'$ fall back so as to close the reverse drive motor circuit. It should be remarked in passing that current is supplied for the motor from any suitable source of supply indicated in the diagram as a generator G. As the valve stem 33 turns, the cam projection $71^c$ turns with it and when it has traveled through 90 degrees it strikes the end of the anchor arm $s^2$ and throws over the reversing switch S, which opens the motor circuit and leaves the same in position to be closed for direct drive when the relay R is again energized. The parts of the valve 65 are now in the position shown in Fig. 1, with the nozzle valve in the position shown in Fig. 3. Grease will then feed through the nipple 67 and the hose 90, through the channels $90^b$ and the port 96 in the valve 93 forcing back the piston 78 and filling the cylinder with a fresh charge. The retrograde movement of the piston and its companion piston 76 (see Fig. 1) is permitted by the opening of the passage 73 to exhaust the oil behind the piston 76, the pressure nipple 68 being at the same time cut off. Thus the grease has time to pass down through the hose 90 and fill the cylinder 79 between shots.

We claim:

1. In a lubricating system for automobiles and the like, a source of supply of lubricant, discharge means connected with said source of supply and including a hose and a nozzle therefor adapted to be applied directly to a bearing, a source of pressure connected to said hose and a pressure actuated member within the said nozzle actuated by the pressure and adapted to exert pressure on the lubricant at the said nozzle whereby the same will be forced therefrom into the bearing, said hose member being equipped with a valve controlling the pressure actuated member, and said valve having openings or ports for allowing the pressure medium to act upon the pressure member and the lubricant to be fed thro' the hose in alternation whereby the latter may be forced into the bearing in predetermined units.

2. In a lubricating system for automobiles and the like, a closed chamber containing a source of supply of lubricant, discharge means for said lubricant outside of said chamber connected with the source of supply and including a hose and a nozzle therefor adapted to be applied directly to a bearing, a source of pressure connected to said hose and a pressure actuated member within the said nozzle actuated by the pressure and adapted to exert pressure on the lubricant at the said nozzle whereby the same will be forced therefrom into the bearing, said hose member being equipped with a valve controlling the pressure actuated member and said valve having openings or ports for allowing the pressure medium to act upon the pressure member and the lubricant to be fed into the hose in alternation whereby the latter may be forced into the bearing in predetermined units.

3. Lubricating apparatus comprising a hose member with a nozzle at the end thereof adapted to be applied to a bearing, a chamber in said nozzle, a plunger or piston in said chamber, a connection from said chamber through said hose to a supply of lubricant, a second connection from said chamber leading to a source of pressure supply and a valve member on said hose having means to control both the pressure medium and the supply of lubricant, the said valve and the pressure port and the lubricant port in said chamber being so related that with the valve in one position said plunger or piston will be forced back and the lubricant drawn in in front of it for charging, while with the valve in the other position the pressure medium will act directly on the plunger so as to force the charge of lubricant out of the nozzle into the bearing in a predetermined amount.

4. An apparatus as described in claim 3 in which the valve member is provided with openings or ports such as to alternately connect the sources of pressure and lubricant supply with the hose member when the valve is turned to different positions, so as to control the actions of the pressure medium and the lubricant and the resultant discharge of the latter.

5. An apparatus as described in claim 3 in which an inner tube is arranged in said hose member leading from a point near the nozzle and to the pressure supply passage of the valve, the said plunger being arranged within said inner tube near the nozzle end, and a second plunger arranged therein near the valve member, a body of oil separating the plungers and allowing communication therebetween whereby they will act in unison passing back and forth a predetermined distance in the tube, a pipe member leading from the lubricant passage of the valve and connecting the same with the outer passage of said hose, and a chamber at the nozzle and connecting the two passages of the hose so as to allow the lubricant in passing through the hose to force the plungers back the predetermined distance in the tube, whereby the lubricant may be discharged in predetermined units by the turning of the valve.

6. An apparatus as described in claim 3 in which an inner tube is arranged in said hose member leading from a point near the nozzle to the pressure supply passage of the valve, the said plunger member being arranged to pass back and forth a predetermined distance within the same, a pipe member leading from the lubricant passage of the valve and connecting the same with the lubricant passage of said hose, and a chamber at the nozzle end connecting the two passages of the hose so as to allow the lubricant in passing through the hose to force the plunger back the predetermined distance in the tube, whereby the lubricant may be discharged in predetermined units by the operation of the valve.

In testimony whereof we hereunto affix our signatures.

ANTHONY F. G. LUCAS.
EDWARD E. CLEMENT.